Sept. 2, 1941.   G. F. THOMAS ET AL   2,254,503
METHOD OF MAKING LUBRICATING APPARATUS
Original Filed Sept. 30, 1935   3 Sheets-Sheet 1
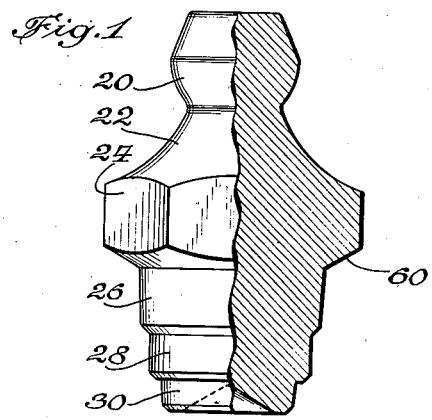
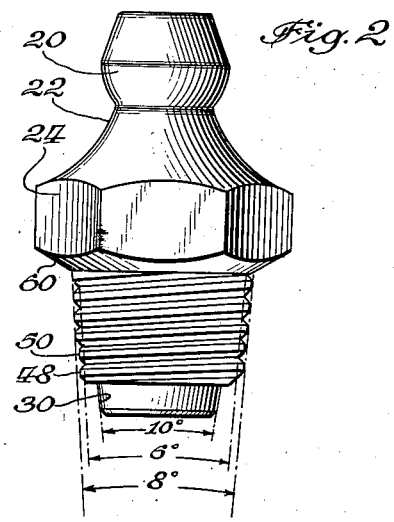
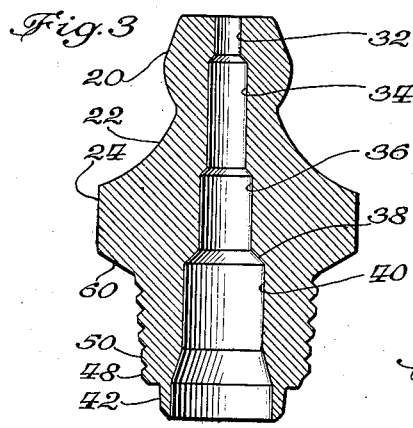
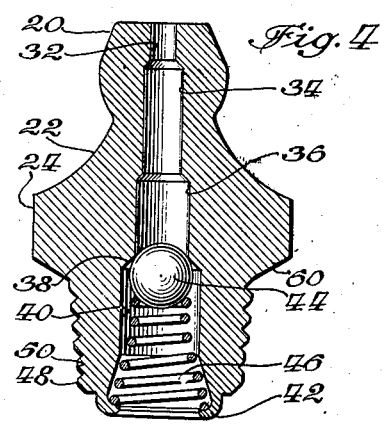
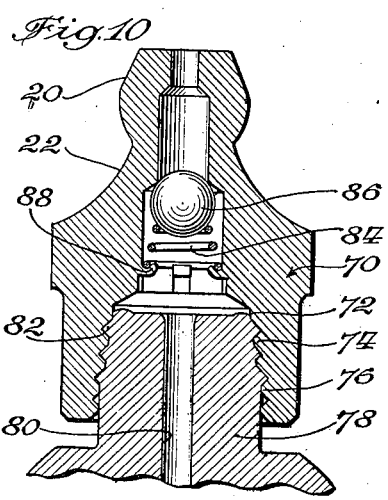
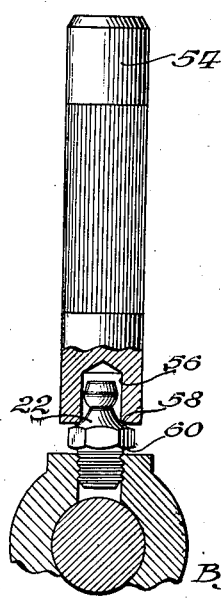
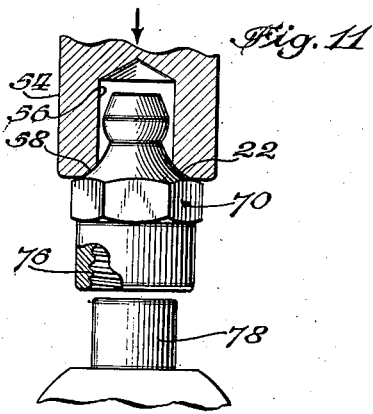
Inventors:
Geo. F. Thomas +
Joseph Bystricky
By Williams, Bradbury, McCaleb + Hinkle
Attys Sept. 2, 1941.　　　　G. F. THOMAS ET AL　　　　2,254,503
METHOD OF MAKING LUBRICATING APPARATUS
Original Filed Sept. 30, 1935　　　3 Sheets-Sheet 2
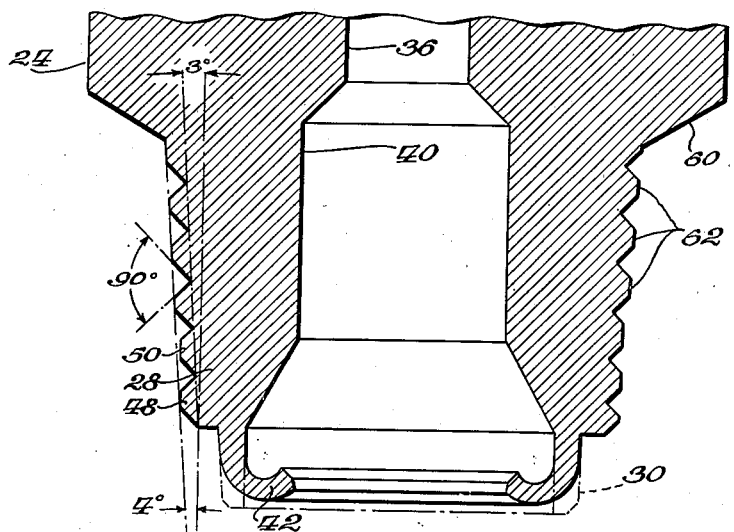
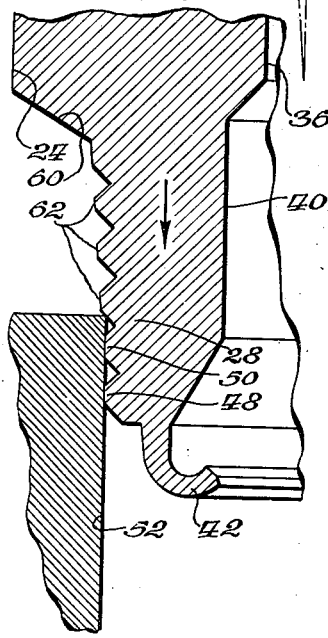 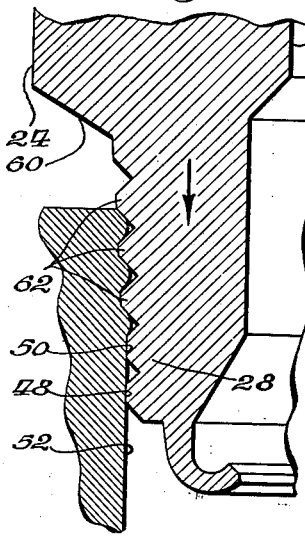 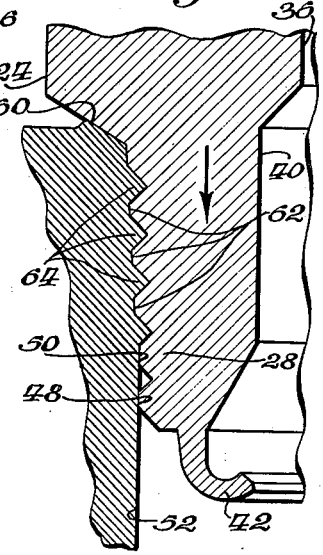
Inventors:
Geo. F. Thomas +
Joseph Bystricky
By Williams, Bradbury, McCaleb & Hinkle
Attys.

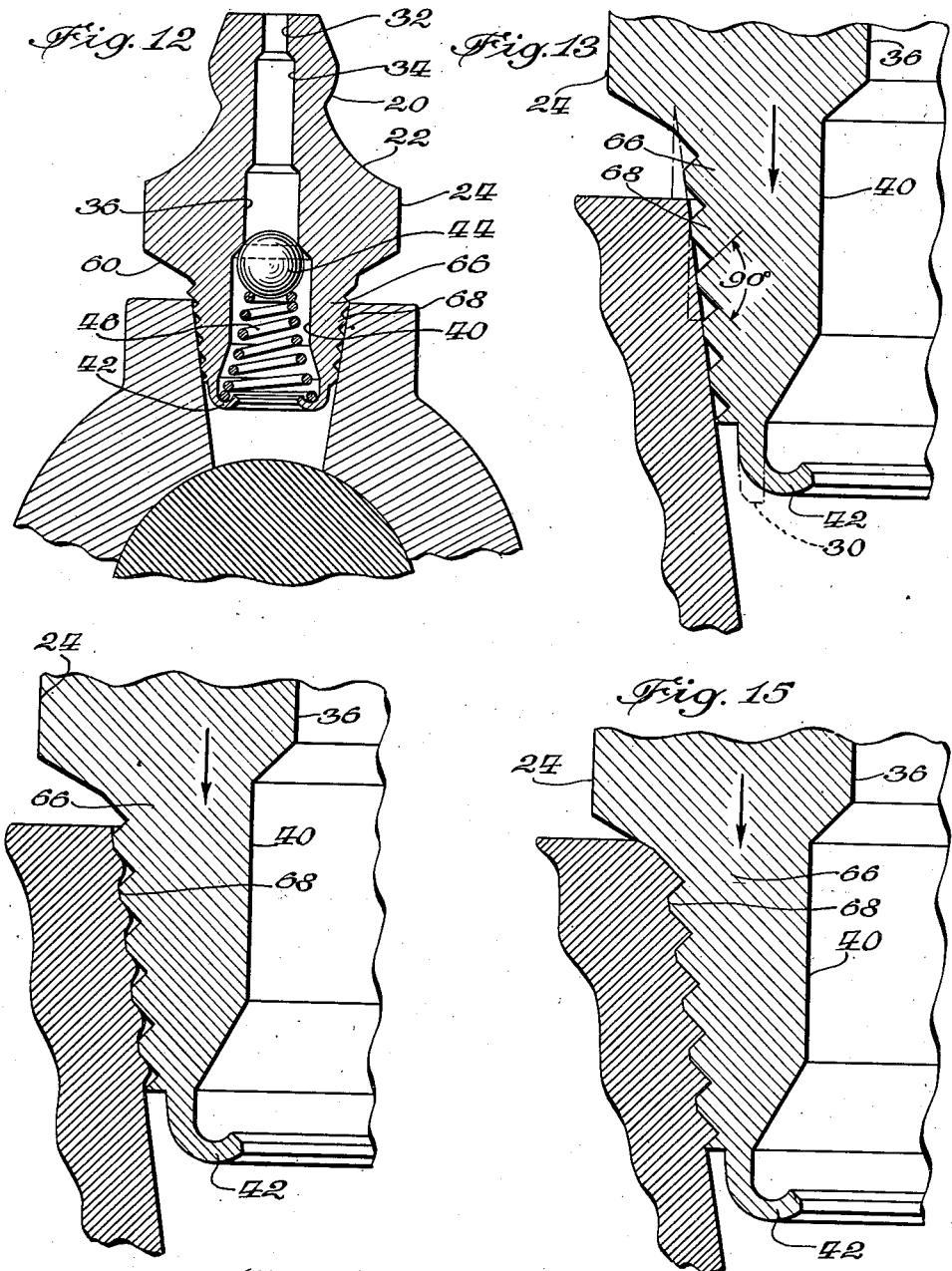

Patented Sept. 2, 1941

2,254,503

UNITED STATES PATENT OFFICE 2,254,503

METHOD OF MAKING LUBRICATING APPARATUS

George F. Thomas, Riverside, and Joseph Bystricky, Chicago, Ill., assignors to Stewart-Warner Corporation, Chicago, Ill., a corporation of Virginia Original application September 30, 1935, Serial No. 42,746. Divided and this application July 1, 1936, Serial No. 88,270

10 Claims. (Cl. 29—157)

Our invention relates generally to high pressure lubricating apparatus, and more particularly to an improved method of making lubricant receiving fittings and an improved method of securing the fitting to a part to be lubricated. More broadly, the invention relates to an improved method of securing metal parts together by a threaded plug and socket connection. This application is a division of our co-pending application Serial No. 42,746, filed September 30, 1935.

An average automobile lubricated by a high pressure lubricating system has in the order of 30 bearings requiring high pressure lubrication. It has been customary in the past to secure the lubricant receiving fitting to the bearings by drilling and tapping an oil hole in the bearing and screwing the fitting thereinto. The additional cost of the tapping operation will be a large fraction of one cent, in the order of one-half cent per individual tapping operation. Furthermore, the production of the bearing parts is frequently delayed by breakage of taps and by losses resulting from defective parts due to failure of the tapped hole to conform to the required standards of perfection of thread. Also, chips and small particles of the metal are frequently left in the threaded oil hole as a result of the tapping operation, and the removal of these chips is an operation adding to the cost of tapping oil holes in bearings. If the metallic chips resultant from the tapping operation are not carefully removed, damage to the bearing surfaces may result.

By the use of the fitting of our present invention the necessity of tapping the oil holes in the bearing parts is entirely eliminated, it being necessary merely to drill the oil holes by usual drilling methods with the usual tolerances permitted. We accomplish this result by providing a lubricant receiving fitting with a hardened threaded shank portion which may be of substantially standard pipe thread pitch but may be of slightly greater taper and of different thread form, inserting the fitting into a drilled oil hole, which is of slightly less diameter than the external diameter of the main portion of the thread on the shank, and driving the fitting longitudinally into the drilled oil hole of the bearing, without rotating the fitting relative to the bearing. We also provide the fitting with a pilot portion by which the fitting may be guided into the oil hole and which will serve as a means to catch and retain small chips which might otherwise fall into the bearing and score the bearing surfaces.

In the method of securing the lubricant receiving fitting to the bearing which is described herein, as the fitting is being driven into the oil hole of the bearing, the hardened threaded shank portion of the fitting swages the metal of the bearing part to form therein a female thread complemental to and meshing with that on the fitting. The connection thus accomplished between the fitting and the bearing has been found to be very tight, being able to withstand lubricant pressures greater than 10,000 pounds per square inch.

It has also been found that by utilizing the method of our invention the fitting may, if necessary, be readily removed from the bearing part by unscrewing it, since the thread formed in the oil hole of the bearing is integral with the bearing and is approximately as strong as a tapped thread.

The thread on the fitting is preferably of relatively low pitch and may, if desired, be of the same pitch as a corresponding standard pipe thread so that should it become necessary to remove the fitting of our present invention, a fitting having a shank with a standard pipe thread thereon may be satisfactorily substituted for the fitting removed.

The fitting may be attached to the bearing by means of being pressed thereinto by a punch press, or may be manually pounded into the bearing part. By either method the time required to secure the fitting to the bearing part is considerably less than that required to screw a fitting in place.

From the above it will be apparent that one of the primary objects of our invention is to provide an improved form of lubricant receiving fitting which may be economically manufactured, which will eliminate the necessity of tapping the oil holes in the bearings, and which may be readily attached to the bearing part.

A further object is to provide an improved method of making lubricant receiving fittings and to provide an improved method of securing the fittings to the parts to be lubricated.

Other objects will appear from the following description, reference being had to the accompanying drawings, in which Figure 1 is a view partly in side elevation and partly in central vertical section, showing a fitting blank as it appears at the end of the forming operation;

Figure 2 is a side elevation of a fitting as it appears after the completion of the threading operation;

Figure 3 is a central vertical cross sectional view of the fitting shown in Figure 2;

Figure 4 is a central vertical cross sectional view of the complete assembled fitting;

Figure 5 is a view illustrating a tool which may be utilized to drive the fitting in place in the oil hole of the bearing, the bearing being shown in transverse cross section in this figure;

Figure 6 is a greatly enlarged longitudinal sectional view of the shank portion of the fitting;

Figure 7 is a view showing one-half of the shank portion of the fitting in position to be driven into the oil hole of a bearing;

Figure 8 is a view similar to Figure 6, illustrating a stage in the operation of driving the fitting into the bearing;

Figure 9 is likewise a view similar to Figure 7, showing the fitting in its final position after it has been completely driven into the oil hole of the bearing;

Figure 10 is a central longitudinal sectional view of a modified form of fitting shown attached to a bearing part;

Figure 11 is an elevational view of the fitting shown in Figure 10 in position to be driven upon a projection forming part of a bearing;

Figure 12 is an enlarged vertical sectional view of a second modified form of our invention shown in position ready to be driven into the oil hole of a bearing; and Figures 13, 14 and 15 are greatly enlarged fragmentary sectional views of the shank of the fitting shown in Figure 12 and illustrating the successive stages as the fitting is being driven into the bearing.

The fitting of our invention is preferably made of a steel which may be readily hardened and which can be formed from wire stock on a cold heading machine. The blank thus produced by the cold heading operation is illustrated in Figure 1 and comprises a head portion 20 which may be suitably conformed to make a mechanical and lubricant tight connection with the discharge coupler of a high pressure lubricant compressor. The head is formed integrally with a generally frustoconically shaped part 22, a polygonal wrench engaging part 24, a tapered shank portion 26, a cylindrical portion 28, and a spring flange forming portion 30.

After the blank has been formed as illustrated in Figure 1, the fitting has threads rolled upon the shank and pilot portions, resulting in the threaded blank as illustrated in Figure 2.

After the blank has been threaded it is drilled and counterbored as best illustrated in Figure 3 to form an inlet opening passageway 32, a cylindrical passageway 34 of slightly greater diameter than the passageway 32, a counterbore 36, a frusto conical valve seat 38, and a spring and check valve receiving counterbore 40. The lower end of the fitting is bored to a diameter slightly greater than that of the check valve chamber 40, to form a depending annular flange 42.

After the fitting has been thus formed the flange lip 42 is bent inwardly to the position in which it is shown in Figure 4, and the shank portion 26 being preferably case hardened so that the threads thereon will be extremely hard. If desired, the threading operation may be deferred until just previous to the hardening operation.

After the hardening operation the fitting may be plated or otherwise suitably finished. After the fitting has been finished a ball check valve 44 is inserted in the valve chamber 40 and a compression coil spring 46 is forced into this chamber, either by direct pressure or by rotating the spring so that it will feed itself into the chamber. When in position, as indicated in Figure 4, the lower coils of the spring 46 will rest upon the inner surface of the internally extending flange 42.

The form of the thread rolled upon the shank of the fitting is of particular significance and is best illustrated in Figures 6 to 9, inclusive. The form angle of the thread is preferably approximately 90° and the root diameter of the thread preferably tapers at an angle of approximately 3° with respect to the axis of the fitting. The top or crest of the thread is preferably flat and the angle between the line drawn through the tops of the convolutions of the thread and the axis of the fitting shows a tapering outer diameter for the thread and is preferably a greater angle than the corresponding angle of a line drawn through the roots of the thread, being herein illustrated as an angle of 4°. It will be noted that the pilot portion 28 of the shank has approximately two complete threads 48, 50, the flat top surfaces of which are cylindrical. The external diameter of the threads 48 and 50 is preferably slightly less than the nominal diameter of the drilled oil hole into which the fitting is to be inserted, as illustrated in Figure 7. These two threads thus form a pilot to guide the fitting into the oil hole. The grooves above the threads designated 48 and 50 serve as traps to catch and retain chips or particles of metal that may possibly be formed as the fitting is forced into the bearing.

In Figure 7 a portion of the side wall of the bearing is indicated by the reference character 52, and only a part of the shank portion of the fitting is shown in the position which it assumes when the fitting is placed in the oil hole of the bearing preparatory to driving it or pressing it into its final position. It will be noted that in this position the pilot threads 48 and 50 fit sufficiently closely to the wall of the oil hole of the bearing that the fitting is held in axial alignment with the oil hole.

A driving tool 54 (Figure 5) having a socket 56 in one end thereof and having a flared surface 58 conforming to the shape of the generally frustoconically shaped part 22 of the fitting, may be used to drive the fitting in place, the tool being struck by hammer or sledge until its inward movement is arrested by the beveled shoulder 60 formed beneath the hexagonal portion 24 of the fitting.

In Figure 8 the fitting is shown driven partially into the bearing, to illustrate how the tapered thread 62 swages a complementary thread in the bearing. The thread 62 being case hardened will not be deformed but will cause the metal of the bearing to flow substantially in the manner as illustrated in Figure 8. The form angle of the thread 62 is such that the metal of the bearing will not be sheared, but instead will be swaged so that the complementary thread formed on the bearing will be integral with the bearing, and in fact, except for slight work hardening, the grain and texture of the metal forming the complementary thread will not be changed. In Figure 8 the complementary thread being formed on the bearing is illustrated as being only partially formed.

In Figure 9 the fitting is illustrated as being driven completely into the oil hole of the bearing and a complete thread 64 complementary to the thread 62 has been formed on the bearing. The extent to which the fitting may be driven into the oil hole of the bearing is limited by the shoulder 60, a portion of which will be pressed into the metal of the bearing and aid in causing the metal of the bearing to flow beneath the topmost turn of the thread 62, in order to insure that the uppermost turn of the thread 64 will be complete and will form a seal with the adjacent surfaces of the thread 62. Inasmuch as pressures in the order of 10,000 pounds per square inch are frequently employed in the application of lubricant through fittings of the type herein illustrated, it is necessary not only that the interlock between the fitting and bearing be sufficiently strong that the fitting will not be loosened by accidental blows, and will not be forced from the bearing by the back pressure of the lubricant, but also that the engaging threads fit each other sufficiently tightly and snugly that the possibility of leakage between the threads is absolutely precluded.

From a consideration of the method by which the thread 64 is formed, as illustrated in Figures 7, 8 and 9, it will be observed that each turn of the thread 62 acts more or less independently of the preceding and following turns to swage a turn of the thread 64 as the fitting is driven into the oil hole of the bearing. Thus, at least three, and under optimum conditions four, complete turns of a thread 64 are formed. Each turn of the thread 64 will in itself be capable of effecting a lubricant-tight seal, and since there are at least three complete turns of the thread, the fitting will be sealed in the bearing even though a minor flaw in the metallic structure of the bearing might render one of the turns of the thread ineffective to form a seal against the escape of lubricant.

Where the bearing part is of such form as to make it feasible, the fitting may be driven into the bearing part in a press. Due to the fact that three or more complete turns of the thread 64 are formed in the bearing, the fitting may be applied to bearings in which the surface is not plane, it being necessary that only one or two complete turns of the thread 64 be formed to prevent leakage of lubricant.

Should the lowermost turn of the thread 62 loosen any chips of metal from the bearing, such chips will be caught in the grooves above the pilot threads 48 and 50 and prevented from falling into the bearing. Since the pilot thread 48, 50 is continuous with the thread 62, the fitting may readily be unscrewed from the bearing should the necessity therefor arise.

Furthermore, as previously stated, the thread on the fitting is preferably of standard pipe thread pitch so that if a damaged fitting is removed it may be replaced with a fitting having the standard pipe thread if another fitting of the type herein disclosed is not readily available.

Since the fitting is driven into the oil hole of the bearing solely by longitudinal movement and is not rotated, the operation of securing the fitting into the bearing is very simple and does not require the use of any complicated tools or machinery. Furthermore, since the thread formed in the bearing is swaged instead of being cut, the possibility of the formation of deleterious metallic chips is minimized.

The method of our invention may be carried out with fittings and other parts of a large number of slightly different forms, the construction illustrated in Figures 12 to 15 being representative of one of a number of possible variations. In these figures the fitting is shown as having a shank 66 formed with a tapered thread 68 which is of substantially the form and character as the thread 62 in the construction previously described, except that the angle of the taper is substantially greater. The included angle of the taper may be in the order of 16° instead of 8° as in the embodiment shown in Figures 1 to 9, inclusive.

In using a fitting of the construction shown in Figures 12 to 15, the oil hole of the bearing is tapered at the same angle as the thread of the fitting and the relative diameters will preferably be such that the major portion of the shank will fit into the oil hole, in general as illustrated in Figs. 12 and 13. The fitting is then driven into the oil hole of the bearing as illustrated in Figs. 14 and 15, Fig. 14 showing the fitting as partially driven into the bearing and illustrating how the female thread in the bearing part is being formed.

Fig. 15 shows the fitting driven completely into the oil hole of the bearing with the female thread in the bearing fully formed and intermeshing with the thread 68 of the fitting. In this construction the number of turns of the thread which may be formed in the bearing part is considerably greater than the number of turns which may be formed with the fitting disclosed in Figs. 1 to 9 inclusive. Each turn of the thread is moved a distance only slightly greater than the pitch of the thread and thus the metal of which the thread is formed need not be displaced as far from its original position as is required in the preferred construction of Figs. 1 to 9 inclusive. While the fitting of Figs. 12 to 15 inclusive thus has the advantage of forming a stronger mechanical and lubricant-tight bond between the fitting and bearing, it has the disadvantage that a tapered hole in the bearing is required and the cost of making the tapered hole within the necessary dimensional limits may largely offset the saving effected by the elimination of the tapping operation.

In Figs. 10 and 11 we have shown a modified form of our invention in which the fitting body 70 has a threaded bore 72 in which the threads 74 are of substantially the same form and taper as the threads in the embodiment of our invention shown in Figs. 1 to 9 inclusive. The bore 72 is enlarged at its lower end so that a pilot thread 76 may be formed therein. In this construction the fitting body 70 is driven over a cylindrical projection 78 of a bearing part which is provided with a lubricant conducting passageway 80. During the operation of the driving the fitting over the projection 78 of the bearing part a helical thread 82 is swaged on the projection 78, said thread meshing with and tightly interengaging with the thread 74 formed in the bore 72 of the body of the fitting. In the construction shown in Figs. 10 and 11 the spring 84 for the ball check valve 86 is seated upon lugs 88 displaced from the body of the fitting in the usual well known manner.

While we have shown and described the method of our invention as applied to securing lubricant receiving fittings to bearings, the fundamental principles of the invention may be employed in making various types of connections as a substitute for the usual screw thread connection. For example, studs, bolts, nuts and machine screws may be provided with a hardened thread of the type herein disclosed and various parts of tools, machinery, and equipment secured together by such fastening means. Our invention will have application wherever it is desired to secure two metal parts together, and particularly where the parts are to be detachably secured together and where the operation of tapping is an item of expense to be considered.

To those skilled in the art it will be readily apparent that the method of our invention may be carried out in a number of slightly different ways and that various modifications in the details of the form of the thread and changes in the method of forming the thread and of securing the parts together may be made without departing from the essential features of our invention. We therefore desire to include within the scope of the following claims all such modifications and variations in the method as are designed to accomplish substantially the same result in substantially the same way.

What we claim as new and desire to secure by Letters Patent of the United States is:

1. The method of securing metallic parts together which comprises forming a number of turns of a low pitch thread having a tapering outer diameter on one part, hardening said threads, forming a cylindrical bore in the other part, and driving the parts together one into the cylindrical bore of the other by substantially rectilinear non-rotative relative movement causing each turn of the thread of the threaded part to swage complementary meshing turns of a continuous thread upon the other part, whereby the parts may be separated by unscrewing one relative to the other.

2. The method of securing metallic parts together which comprises forming a number of turns of a tapering outer diameter low pitch screw thread of substantially 90° V form upon one of the parts, forming a cylindrical bore in the other part, and driving the parts together one into the cylindrical bore of the other by substantially rectilinear non-rotative relative movement to cause each of several turns of the thread on the threaded part to swage complementary meshing turns of a thread upon the other part, whereby the parts may be separated by unscrewing one relative to the other.

3. The method of securing metallic parts together which comprises forming hardened low pitch threads of generally 90° V form and tapering outer diameter on one part, hardening said threads, forming a cylindrical bore in the other part, and driving the parts together one into the cylindrical bore of the other by substantially translatory relative movement without relative rotation to cause the threaded part alone to swage a complementary meshing thread upon the other part, whereby the parts will be secured together in fluid-tight interlocking engagement and may be separated by unscrewing one relative to the other.

4. The method of securing metallic parts together which comprises forming a female low pitch hardened screw thread of substantially 90° V-form and tapered outer diameter on one of the parts, and driving said part over the other part by rectilinear non-rotative relative movement to cause the threaded part independently to swage a complementary meshing thread upon the other part, whereby the parts will be tightly secured together but may be separated by unscrewing one relative to the other.

5. The method of making a fluid tight joint between a metallic plug member and a metallic socket member which comprises forming upon one of said members a rugged, hardened low pitch helical thread having a tapering outer diameter, forcing said plug member into said socket member by rectilinear non-rotative displacement of one member relative to the other, thereby causing each of several turns of the thread on the threaded member to swage complementary meshing turns of a thread upon the other of said members.

6. The method of securing a lubricant receiving metal fitting in a substantially cylindrical bore in a metal part to be lubricated, which comprises, forming a continuous thread on the shank of the fitting of tapered outer diameter, hardening the threaded part of the shank, and driving the shank of the fitting longitudinally into the hole of the part to be lubricated without relative rotation between the fitting and said part whereby the thread itself on the fitting will swage a complementary internal thread in the part to be lubricated.

7. The method of making a fluid-tight joint between a tapered plug member and a socket member of metal, which comprises forming upon said plug member a hardened low pitch helical thread, the major portion of which is of greater diameter than the bore of said socket member, forcing said plug member into said socket member solely by rectilinear displacement of one member relative to the other to cause displacement of metal solely from the walls of the bore of the socket member, thereby causing the thread on said plug member to swage the metal displaced from the wall of the socket member into a complementary meshing thread.

8. The method of securing a lubrication fitting in a substantially cylindrical bore in a metal body, said lubrication fitting having a head and a shank formed with a screw thread, said thread being tapered from the portion nearest the head outwardly toward the end thereof, comprising, inserting the fitting shank in the bore with an inwardly facing surface thereof adapted to be exposed to the pressure of fluid within the bore, and forcing said shank into the bore by rectilinear non-rotative relative movement to cause turns of said thread to displace metal from the body into the groove between the displacing turns of the thread and a turn in advance thereof, to retain the shank in the bore against the action of lubricant pressure on said surface and to seal the shank against lubricant leakage therearound.

9. The method of securing a lubrication fitting in a substantially cylindrical bore in a metal body, said lubrication fitting having a shank formed with a series of axially displaced projections of successively increasing diameter in one direction with the smallest diameter less than that of the bore and the largest diameter greater than that of the bore, comprising, inserting the smaller end of the fitting shank in the bore with an inwardly facing surface thereof adapted to be exposed to the pressure of fluid within the bore, forcing said shank axially into the bore without turning it, and causing said projections of larger diameter than the bore successively to displace metal from the body into the spaces between successive projections to retain the shank in the bore against the action of lubricant pressure on said surface and to seal the shank against lubricant leakage therearound.

10. The method of interlocking two metal elements of different degrees of hardness in threaded relation comprising, providing a low pitch helical ridge on a frusto-conical surface of the harder of the two elements, the less hard of said elements having a cylindrical surface, and, without relative rotation, and by application of a force which is rectilinear with respect to said cylindrical surface, telescoping said elements with one of said surfaces within the other, the cylindrical surface having a diameter intermediate the largest and smallest diameter of the ridged portion of the frusto-conical surface on the harder of said elements, whereby said ridge swages the metal subjacent said cylindrical surface in a progressive manner to form an interlocking ridge conformed to permit disengagement of the parts by application of a rotary couple thereto without further deformation of the metal of either of said parts.

GEORGE F. THOMAS.
JOSEPH BYSTRICKY.

CERTIFICATE OF CORRECTION.

Patent No. 2,254,503. September 2, 1941.

GEORGE F. THOMAS, ET AL.

It is hereby certified that error appears in the printed specification of the above numbered patent requiring correction as follows: Page 4, first column, line 61, claim 3, before "translatory" insert --rectilinear--; and that the said Letters Patent should be read with this correction therein that the same may conform to the record of the case in the Patent Office.

Signed and sealed this 30th day of December, A. D. 1941.

Henry Van Arsdale, (Seal) Acting Commissioner of Patents.